United States Patent [19]

Doi et al.

[11] Patent Number: 4,969,355

[45] Date of Patent: Nov. 13, 1990

[54] APPARATUS FOR MEASURING TIRE UNIFORMITY

[75] Inventors: Shunichi Doi; Satoru Matsushima; Yoshiteru Mizutani; Yuzo Yamamoto; Michio Ishiguro; Shigeru Sakuma; Noboru Sugiura, all of Aichi, Japan

[73] Assignee: Kabushiki Kaisha Toyota Chuo Kenkyusho, Aichi, Japan

[21] Appl. No.: 477,093

[22] Filed: Feb. 8, 1990

[30] Foreign Application Priority Data

Feb. 15, 1989 [JP] Japan .................................. 64-35741

[51] Int. Cl.$^5$ ........................................ G01M 17/02
[52] U.S. Cl. ............................................. 73/146
[58] Field of Search ................................. 73/146, 8, 9

[56] References Cited

U.S. PATENT DOCUMENTS

| 3,473,422 | 10/1969 | Leblond | 73/146 |
| 4,458,526 | 7/1984 | Doi et al. | 73/146 |
| 4,753,110 | 6/1988 | Burchett et al. | 73/146 |

Primary Examiner—Donald O. Woodiel
Attorney, Agent, or Firm—Blum Kaplan

[57] ABSTRACT

A tire uniformity measuring apparatus having: a drum for rotating a tire; an oscillating member disposed parallel to a drum rotating shaft and pivotally supported on a machine base through a fulcrum; a movable member disposed in parallel to the drum rotating shaft in the plane including the drum rotating shaft and a tire rotating shaft, the movable member being laterally movable in response to a load acting on the tire in a lateral direction perpendicular to the radial direction of the tire; a load applying member for applying in advance a predetermined load to the tire; and a displacement detecting member for detecting as a displacement of the movable member the displacement of the tire rotating shaft which is dependent on variation in the lateral load; thereby detecting a variation in the lateral load of the tire. The apparatus may comprise a further movable member which is a shaft member constituting the fulcrum, the movable member being slidably movable along the longitudinal axis only in response to a variation in the tangential load, and a further displacement detecting member for detecting a displacement of the movable member, thereby detecting a variation in the tangential load acting on the tire.

11 Claims, 7 Drawing Sheets

APPARATUS FOR MEASURING TIRE UNIFORMITY

BACKGROUND OF THE INVENTION

1. Field of the Invention

The present invention relates to a tire uniformity measuring apparatus for simply measuring variations in the lateral, radial and tangential loads acting on the tire being measured.

2. Description of the Prior Art

One of the factors which govern vibrations, noise and drivability of a vehicle is considered to be tire uniformity, that is, the uniformity in the outer shape, dimensions and rigidity of the tires. A variety of tire uniformity measuring apparatus have heretofore been proposed and put to practical use for checking such tire uniformity.

Conventional tire uniformity measuring apparatus include a rotatable cylindrical drum against which a tire being measured is held at a fixed interaxial distance for measuring a variation in the reactive force (hereinafter referred to as "R.F.V.") acting radially on the drum shaft or tire shaft while the drum and the tire are in rolling movement. With the fixed interaxial distance between the drum and the tire, the conventional apparatus are required to have a relatively high overall rigidity. The known apparatus are also disadvantageous in that the drum must be driven to rotate at high speeds, say, several tens of revolutions per minute, a sophisticated electrical measurement circuit is required and the apparatus are large in size, costly to construct and take a long period of time for measurement.

Under these circumstances, the present inventors have devised a tire uniformity measuring apparatus which eliminates the above-described problems of the conventional apparatus (see U.S. Pat. No. 4,458,526).

In this tire uniformity measuring apparatus, the interaxial distance between the tire that rolls under a certain load and the drum is not fixed, but a small displacement of the rotatable shaft to which the tire is secured is positively allowed to thereby detect a force corresponding to the reactive force acting on the shaft as a displacement of a movable member. The measuring apparatus can measure a variation in the radial force acting on the tire with high precision under a condition close to an actual running condition. The measuring apparatus is also easy to handle, light in weight, compact and less costly to construct.

However, when the tire has a large localized deformation, a large lateral force component is generated in the surface where the tire and the drum are held in contact with each other while they are in rolling movement, and a moment due to such lateral force component causes a large variation in the R.F.V. value. The resulting R.F.V. value must therefore be compensated for. Thus, the proposed prior art apparatus involves the problem of influence of such a lateral force component.

In view of the above, the present inventors have devised a tire uniformity measuring apparatus for accurately measuring a variation in the radial force acting on a tire while eliminating any influence of a moment due to a lateral force imposed on the tire under a condition close to an actual running condition.

However, the proposed measuring apparatus still suffers from the following problems. When the tire has a large localized deformation or when the tire has such a deformation that the tire rolling surface is not uniform in the longitudinal and lateral directions, variations in the lateral and tangential loads are generated in addition to a variation in the radial tire load. However, the proposed prior art apparatus cannot readily detect and evaluate these additional variations (hereinafter referred to as "L.F.V. and T.F.V.", respectively).

SUMMARY OF THE INVENTION

The present inventors have continued systematic experiments and theoretical analyses in order to eliminate the problems of the tire uniformity measuring apparatus according to the prior invention and has reached the present invention.

It is an object of the present invention to provide a tire uniformity measuring apparatus for accurately measuring variations in the lateral and tangential loads imposed on the tire being measured in respective directions which are perpendicular to the line of action of the load imposed radially of the tire, in addition to a variation in the radial load under a condition close to an actual running condition.

Another object of the present invention is to provide a tire uniformity measuring apparatus for measuring variations in the radial, lateral and tangential loads imposed on the tire being measured, the apparatus being easy to handle, light in weight, compact and inexpensive.

Prior to description of the present invention, the principles of the present invention for measuring variations in the lateral, tangential and radial loads imposed on the tire being measured will be explained with reference to FIGS. 4a and 4b.

Figure 4A:
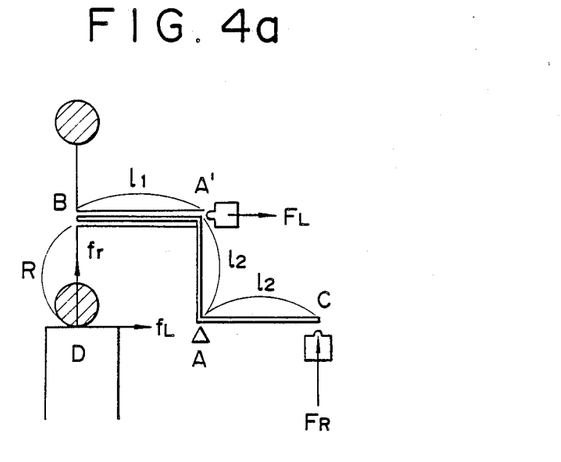
FIGS. 4a and 4b show the principles of measurement by the apparatus of the present invention.

FIG. 4a shows an equivalent lever utilized to explain the principles of measurement according to the present invention. In the figure, the symbol A denotes a fulcrum, A' a point of application of force which also serves as a point for measuring a displacement (load), B a point where force $f_r$ acts from the tire being measured, C a point for measuring a displacement (load) and D a point where the tire and the drum are held in contact with each other while they are in rolling movement. It is assumed that the distance from the point A' to the point B, the distance from the point A to the point C and the distance from the point B to the point D are $l_1$, $l_2$ and R, respectively. The lateral force that is generated at the point D is assumed to be $f_1$, the lateral force $f_1$ being either positive or negative since it may be imposed either rightward or leftward across the tire.

It is assumed that the weight of the equivalent lever and the relative load applied are respectively zero (in a state of balance). The force that corresponds to a variation in the radial force (R.F.V.) applied to the tire is $f_r$, and the force that corresponds to a variation in the lateral force (L.F.V.) is $f_1$.

More specifically, the radial and lateral forces in this case must balance with the outputs $F_R$ and $F_L$ at the respective measuring points.

When the radial force $f_r$ acts, the resulting outputs $F_R$ and $F_L$ for the radial and lateral force components are as follows:

$$F_R = f_r \frac{l_1}{l_2}, \quad F_L = 0 \qquad [1]$$

When the lateral force $f_1$ acts, the resulting outputs $F_L$ and $F_R$ are as follows:

$$F_L = f_l \quad F_R = f_l \frac{l_2 - R}{l_2} \qquad [2]$$

Assuming that the point D where the tire and the drum are held in contact with each other while they are in rolling movement is a point of application of load and the forces $f_r$ and $f_l$ are applied at the same time, the outputs $F_R$ and $F_L$ are obtained from the equations [1] and [2], as follows:

$$F_R = f_r \frac{l_1}{l_2} + f_l \frac{l_2 - R}{l_2} \quad F_L = f_l \qquad [3]$$

The equations [3] are rearranged with respect to $f_r$ and $f_l$, respectively, as follows:

$$f_r = \frac{l_2 F_R - (l_2 - R) F_L}{l_1} \quad f_l = F_L \qquad [4]$$

It will be understood that the equations [4] become simple relationships as shown below only when $l_1 = l_2 = R$:

$$f_r = F_R \quad f_l = F_L \qquad [5]$$

The equations [5] reveal that the radial and lateral forces at the point of rolling contact between the tire and the drum can be measured with high accuracy by properly setting the equivalent lever length and the positional relationship.

Although the foregoing description has been made in regard to the radial and lateral forces, the tangential force, which is another transverse force, can also be expressed in the same way.

Figure 4B:
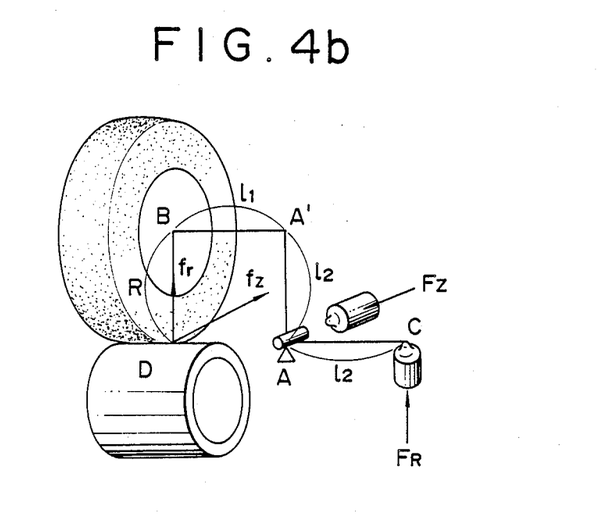

More specifically, FIG. 4b shows an equivalent lever utilized to explain the principles of measurement according to the present invention in the same way as in FIG. 4a in the case where the radial and tangential forces are obtained separately from each other.

Among the transverse forces generated at the point D, the tangential force is assumed to be $f_z$, the tangential force $f_z$ being either positive or negative since it may be imposed either forward or rearward tangentially to the tire.

Assuming that the outputs at the respective measuring points are $F_R$ and $F_Z$, respectively, the radial force $f_r$ and the tangential force $f_z$ are obtained from the respective equations of balance in the same way as in the case of FIG. 4a, as follows:

$$f_r = F_R \quad f_z = F_Z \qquad [6]$$

It will therefore be understood that the radial and tangential loads can be measured with high accuracy by properly setting the equivalent level length and the positional relationship.

The present invention can be put into practice in the following aspects.

According to a first aspect of the present invention, there is provided a tire uniformity measuring apparatus comprising: a drum for rotating a tire which is to be measured; a tire rotating shaft having a tire securing portion for securing the tire; an oscillating member disposed parallel to the rotating shaft of the drum and pivotally supported at one end thereof on a machine base through a fulcrum; a first movable member disposed within the oscillating member in parallel to the drum rotating shaft in the plane including the drum rotating shaft and the tire rotating shaft, the first movable member having at one end thereof a support portion rotatably supporting the tire rotating shaft, and the first movable member being laterally movable in response to a load acting on the tire rolling on the drum in a lateral direction perpendicular to the radial direction of the tire; load applying means for applying in advance a predetermined load to the tire by changing the interaxial distance between the drum rotating shaft and the tire rotating shaft by moving the drum; first displacement detecting means interposed between the oscillating member and the first movable member for detecting as a displacement of the first movable member the displacement of the tire rotating shaft which is dependent on variation in the lateral load acting in a direction perpendicular to the line of action of the load applied radially of the tire when rotated by the drum; and display means for displaying the variation in the lateral load acting in the direction perpendicular to the radial direction of the tire on the basis of the displacement of the first movable member; whereby the variation in the lateral load acting on the tire is measured.

With the first aspect of the invention, when the tire being measured is rotated by the drum, the first movable member that is fitted in the oscillating member moves laterally in response to a variation in the lateral tire force acting on the surface of contact between the tire and the drum in a direction perpendicular to the radial direction of the tire and the displacement of the first movable member is detected by the first displacement detecting means. Thus, the variation in the lateral tire load can be detected with high accuracy independently of other force components. The apparatus according to the first aspect of the invention comprises a relatively simple mechanism and, unlike the conventional apparatus wherein a variation in the reactive force acting on the drum shaft or tire shaft is measured with the fixed interaxial distance between the drum and the tire being measured, the apparatus of the present invention is required to have no particularly high overall rigidity. Further, since the apparatus of the present invention needs no sophisticated electric circuit or other similar device for measurement, it can be formed using very simple devices and is therefore compact, light in weight and less costly.

According to a second aspect of the present invention, the oscillating member comprises a second movable member having the fulcrum which is disposed in or near the plane including the surface of rolling contact between the tire and the drum so that the second movable member pivots about the fulcrum in response to the radial tire load that acts between the drum and the tire, and the apparatus further comprises second displacement detecting means interposed between the machine base and the second movable member for detecting as a displacement of the second movable member the displacement of the tire rotating shaft which is only dependent on variation in the radial load acting on the tire when rotated by the drum, thereby measuring the variation in the radial load acting on the tire.

With the second aspect, the fulcrum of the second movable member is disposed in or near the plane including the surface of rolling contact between the drum and the tire being measured. It is therefore possible to eliminate a moment arm due to a lateral tire force acting perpendicularly to the direction of rotation of the tire on the surface of contact between the tire and the drum when the tire is rotated by the drum. The tire uniformity measuring apparatus is therefore free from the influence of the lateral tire force and capable of accurately detecting only a variation in a load imposed radially of the tire.

Since the radial load detecting mechanism associated with the second movable member is independent of the lateral load detecting mechanism associated with the first movable member, it is possible to detect in a quite ideal condition loads imposed laterally and radially of the tire and variations in these loads independently of each other.

According to a third aspect of the present invention, the tire uniformity measuring apparatus further comprises a third movable member which is a shaft member constituting the fulcrum of the second movable member, the third movable member being disposed at right angles to the tire rotating shaft and supported in such a manner as to be slidable along its longitudinal axis so that the third movable member is movable along the longitudinal axis only in response to a variation in the tangential load acting on the tire when rotated by the drum, and third displacement detecting means interposed between the third movable member and the machine base for detecting a displacement of the third movable member, thereby detecting a variation in the tangential load on the tire.

With the third aspect, the third movable member is disposed so as be movable along the longitudinal axis of the pivot shaft constituting the fulcrum of the second movable member, and the movement of the third movable member in response to a variation in the tangential force acting on the tire is detected by the third displacement detecting means. Thus, it is possible to accurately detect a variation in the tangential tire force acting perpendicularly to the radial and lateral tire forces.

In the apparatus according to the third aspect, the tangential force detecting mechanism detects the linear axial movement of the pivot shaft that constitutes the fulcrum of the second movable member independently of the radial and lateral tire force detecting mechanisms. It is therefore possible to detect a variation in the tangential load on the tire in an ideal condition.

The first movable member may be disposed inside either the member secured to the machine base according to the first aspect of the invention or the second movable member according to the second aspect so that the first movable member is slidable along the axis of the tire rotating shaft in response to a variation in the load imposed laterally of the tire, thereby detecting a variation in the lateral tire load.

Although in the apparatus according to the first, second and third aspects of the invention the drum and the tire are disposed in vertically opposing relation to each other, the arrangement maY be such that the drum and the tire are disposed in horizontally opposing relation to each other and the movable members and the displacement detecting means are disposed in conformity to the horizontal arrangement of the drum and tire. In such a case also, it is possible to detect variations in the lateral, radial and tangential loads on the tire.

According to a fourth aspect of the present invention, there is provided a tire uniformity measuring apparatus comprising: a drum for rotating a tire which is to be measured; a second oscillating member pivotally supported on a machine base through a fulcrum within the plane including the surface of rolling contact between the tire and the drum so that the second oscillating member pivots about the fulcrum in response to the radial tire load acting between the tire and the drum; a drum rotating shaft for supporting the drum; a fourth movable member having at one end thereof a support portion for rotatably supporting the drum rotating shaft, the fourth movable member being disposed within the second oscillating member in such a manner that its longitudinal axis is coaxial with the drum rotating shaft and parallel to the axis of rotation of the tire, thereby enabling the fourth movable member to move along the longitudinal axis in response to a lateral load acting on the tire in a direction perpendicular to the radial direction of the tire; fourth displacement detecting means interposed between the fourth movable member and the second oscillating member for detecting as a displacement of the fourth movable member the displacement of the drum rotating shaft which is only dependent on the variation in the lateral tire load caused by a variation in the lateral load acting in a direction perpendicular to the radial direction of the tire when rotated by the drum; and display means for displaying the variation in the lateral load acting in the direction perpendicular to the radial direction of the tire on the basis of the displacement of the fourth movable member; whereby the variation in the lateral load acting on the tire is measured.

Unlike the apparatus according to the first aspect wherein the movable member is associated with the tire rotating shaft, the apparatus according to the fourth aspect has the movable member associated with the drum rotating shaft to detect a displacement of the drum rotating shaft in response to a variation in the lateral tire load. The basic principles of detection of a variation in the lateral tire load are the same as those in the apparatus according to the first aspect of the present invention.

With the fourth aspect, no movable member needs to be attached to the tire rotating shaft and it is therefore possible to measure a tire in a state wherein it is attached to a vehicle, that is, in a state wherein the weight of the vehicle itself acts as an applied load. Accordingly, a variation in the lateral load can be measured in an ideal condition at any time and for any type of tires having different effective radii without the need to compensate for the results of measurement by electrical processing for each particular tire configuration. Thus, it is possible to realize measurement with high precision and excellent general-purpose properties.

The apparatus according to the fourth aspect is required to have no particularly high rigidity and can be formed in a very simple structure in the same way as in the case of the apparatus according to the first aspect of the invention. It is therefore compact, light in weight and less costly.

According to a fifth aspect of the present invention, the tire uniformity measuring apparatus according to the fourth aspect further comprises fifth movable member constituted of the second oscillating member involving the fourth movable member and disposed within the plane including the axes of rotation of the tire and the drum, with the fulcrum which corresponds to the center of motion of the member with respect to the tire being disposed in or near the plane including the surface of rolling contact between the drum and the tire, so that the fifth movable member is movable about the fulcrum within the plane in response to a variation in the radial tire load acting between the drum and the tire, and fifth displacement detecting means interposed between the fifth movable member and the machine base for detecting as a displacement of the fifth movable member the displacement of the drum rotating shaft which is dependent only on variation in the radial load acting on the tire, thereby measuring a variation in the radial load acting on the tire in addition to a variation in the lateral load.

With the fifth aspect, a fifth movable member which involves the first movable member in the tire uniformity measuring apparatus according to the fourth aspect is provided and the center of movement of this member is disposed in or near the plane including the surface of rolling contact between the drum and the tire. It is therefore possible to eliminate a moment arm due to a lateral tire force acting perpendicularly to the direction of rotation of the tire on the surface of contact between the tire and the drum when the tire is rotated by the drum. The tire uniformity measuring apparatus is therefore free from the influence of the lateral tire force and capable of accurately detecting only a variation in a load imposed radially of the tire as a displacement of the fifth movable member.

Since the radial load detecting mechanism associated with the fifth movable member is independent of the lateral load detecting mechanism associated with the fourth movable member, it is possible to detect in an ideal condition a load imposed radially of the tire and a variation in the radial tire load irrespective of the configuration of the tire being measured.

According to a sixth aspect of the present invention, the tire uniformity measuring apparatus according to the fifth aspect of the invention further comprises a sixth movable member which is a shaft member constituting a fulcrum corresponding to the center of movement of the fifth movable member, the sixth movable member being supported axially slidably so that it moves only in response to a variation in the tangential load on the tire, and sixth displacement detecting means for detecting the displacement of the sixth movable member, thereby detecting a variation in the tangential load on the tire.

With the sixth aspect, the sixth movable member is disposed so as be movable along the longitudinal axis of the pivot shaft constituting the fulcrum of the fifth movable member. Thus, it is possible to accurately detect as a displacement of the sixth movable member only a variation in the tangential load on the drum which changes only in response to a variation in the tangential tire load acting on the surface of contact between the tire and the drum when the tire is rotated by the drum.

In the apparatus according to the sixth aspect, the tangential force detecting mechanism detects the linear axial movement of the pivot shaft that constitutes the fulcrum of the fifth movable member independently of the radial and lateral tire force detecting mechanisms. It is therefore possible to detect a variation in the tangential load on the tire in an ideal condition and also detect variations in the lateral, radial and tangential loads simultaneously and independently with a single measuring apparatus.

It is also possible to measure variations in the lateral and radial loads acting on four tires of a vehicle independently or in combination with the tires being attached to the vehicle by employing a tire uniformity measuring system comprising: a tire uniformity measuring apparatus installed directly below the tire grounding surface at a position corresponding to each of the four tires of a vehicle to be measured, the measuring apparatus including a drum for rotating the tire being measured, the fourth movable member according to the fourth aspect of the invention which is movable in response to a variation in the lateral tire load and the fourth displacement detecting means or/and either one of the fifth and sixth movable members according to the fifth and sixth aspects of the invention which are movable in response to variations in the radial and tangential tire loads, respectively, together with the fifth or sixth displacement detecting means for detecting a displacement of the fifth or sixth movable member; display mean for displaying variations in the above-mentioned load(s) acting on the tires, the display means being disposed above the surface of rolling contact between the tires and the respective drums; and securing means for securing the vehicle. With this arrangement, the tires can be measured for tire uniformity simply by mounting the vehicle equipped with these tires onto the tire uniformity measuring system, without the need to detach and remount each tire for measurement. Thus, the operating efficiency improves markedly.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

The present invention will be described below in detail with reference to the accompanying drawings.

A first embodiment of the tire uniformity measuring apparatus according to the present invention will first be explained with reference to FIGS. 1 to 3.

Figure 1:
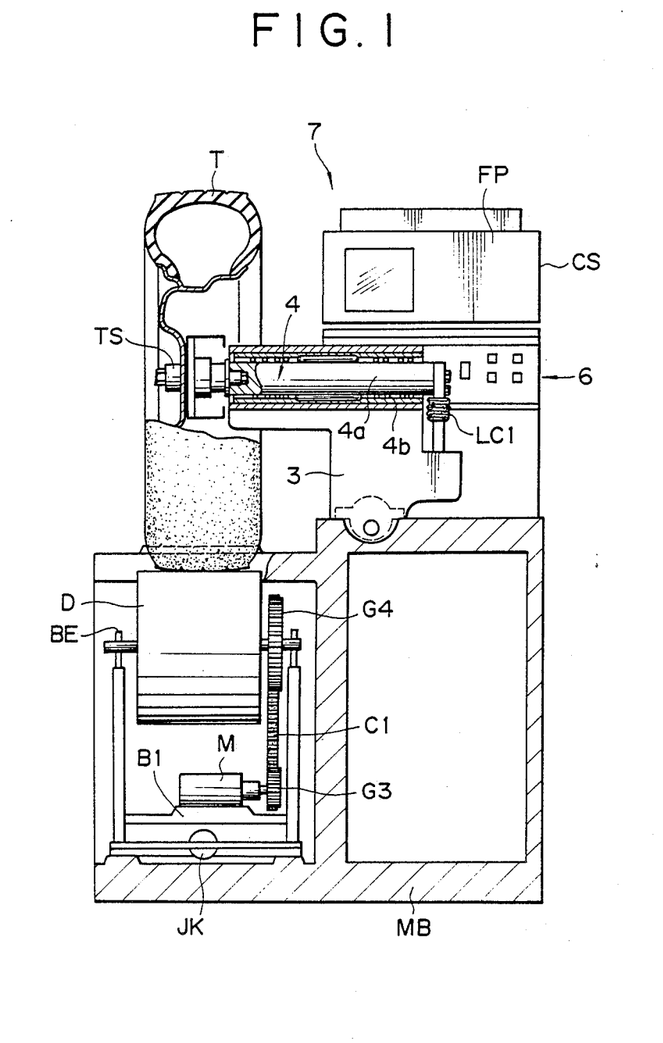
FIGS. 1 to 3 show in combination a first embodiment of the tire uniformity measuring apparatus according to the present invention, FIG. 1 being a front view of the apparatus, FIG. 2 a side view of the apparatus, and FIG. 3 a block diagram of an electric circuit in the apparatus.
Figure 2:
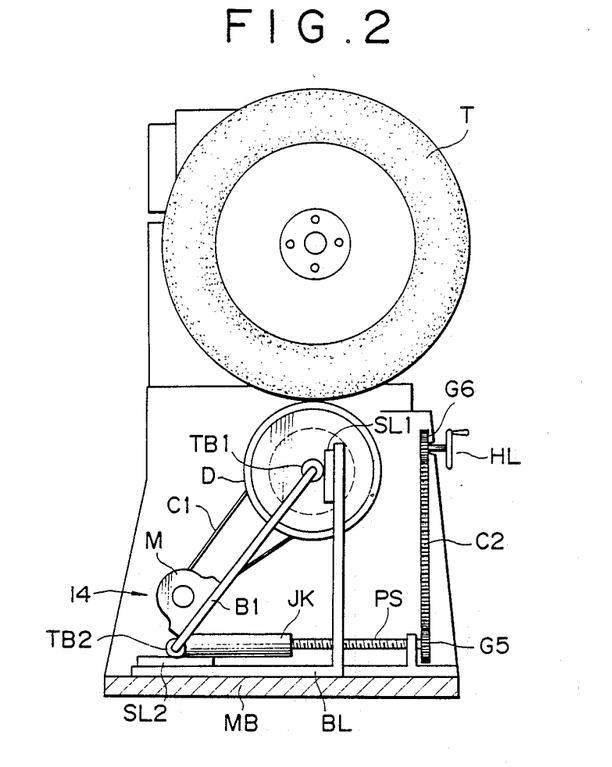

As shown in FIGS. 1 and 2, the tire uniformity measuring apparatus comprises a rotary drum D driven through a chain C1 by an electric motor M mounted on a base B1 above a jack JK installed on a machine base MB, a tire support member TS rotatably supporting a tire T which is to be measured, a crank-shaped member 3 secured at the lower end thereof to the machine base MB to constitute a box-shaped equilibrium beam, a first movable member 4 provided in the crank-shaped member 3 to rotatably support the tire T at one end thereof, the first movable member 4 being disposed parallel to the axis of the shaft of the rotary drum D and slidable along the axis of the tire rotating shaft of the tire support member TS, a first load cell LC1 disposed between one end of the first movable member 4 and the machine base MB, a load applying means 14 for applying a predetermined load to the tire T by raising or lowering the drum D through the jack JK, a computing means 6 for measuring and computing a variation in the lateral force acting perpendicularly to the radial direction of the tire T that is outputted from the first load cell LC1 in response to a very small displacement of the first movable member 4 along the axis of the tire rotating shaft which possibly occurs as the tire T rolls, and a display means 7 for displaying the measured values and the results of computation.

In the tire uniformity measuring apparatus according to the first embodiment, the first movable member 4 comprises a cylindrical linear motion shaft $4a$ which is disposed parallel to the axis of the shaft of the rotary drum D. The first movable member 4 is coaxially inserted into a cylindrical linear motion bearing $4b$, specifically a stroke ball bearing, which is fitted in the crank-shaped member 3 constituting the box shaped equilibrium arm which is pivotally supported on the machine base MB at a position above the surface of contact between the tire T and the drum D. The first movable member 4 rotatably supports the tire T at one end thereof through the tire support member TS and is supported in such a manner as to be slidable along the axis of the tire rotating shaft of the support member TS. To the end of the cylindrical linear motion shaft $4a$ which is remote from the tire T is integrally connected the first load cell LC1 secured to the crank-shaped member 3 supporting the stroke ball bearing $4b$ to detect a lateral displacement of the tire rotating shaft which is dependent on variation in the lateral force acting on the tire T. Thus, a variation in the lateral load imposed on the tire T is detected on the basis of the detected lateral displacement of the tire rotating shaft. More specifically, the cylindrical linear motion shaft $4a$ that extends longitudinally of the tire rotating shaft is internally in contact with the rolling contact surface of the stroke ball bearing $4b$ so as to be linearly movable along the longitudinal axis, thereby making it possible to detect only a lateral force component acting on the surface of slide contact between the tire T and the drum D in the form of a longitudinal axial force acting on the tire rotating shaft. In the first embodiment, further, the cylindrical linear motion shaft $4a$ is disposed in the stroke ball bearing $4b$ which is within the plane including both the axes of rotation of the drum D and the tire T to detect only a lateral tire force, together with a lateral force variation, acting between the tire T and the drum D in a direction perpendicular to the radial direction of the tire T in the form of movement of the cylindrical linear motion shaft $4a$ serving as the first movable member 4.

As the first load cell LC1, a cantilever type bending stress-sensitive load cell is usually employed; however, a tensile and compressive stress-sensitive load cell may also be used.

The load applying means 14 comprises a drum driving system employing a mount base B1 which slides smoothly on slide surfaces SL1 and SL2 provided on a support base BL with an inverted L-shaped cross-sectional which is disposed on the machine base MB, as shown in FIG. 2. The mount base B1, which is rigid, has one end thereof defined as a drum shaft supported through a bearing BE, as shown in FIG. 1, two ends of the drum shaft being slidable on the slide surface SL1 through single-row bearings TB1. Further, an electric motor M is installed on the mount base B1 to drive the drum D having a diameter of 300 mm through a chain C1. The chain C1 is engaged with a gear G3 and a driven gear G4 to drive the tire T to rotate at 5 revolutions per minute by properly setting a gear ratio between the two gears and a number of revolutions of the motor M. A pair of right and left single-row bearings TB2 are disposed at the other end of the mount base B1 to slide on the slide surface SL2. The jack JK is installed in the center of the lower end of the mount base B1 to slide the lower end portion of the mount base B1 back and forth by means of a drive screw PS extending through a bearing installed on the machine base MB. The jack JK is driven through a chain C2 engaged with two gears G5 and G6 by rotating a handle HL rotatably supported on the machine base MB and disposed outside the machine frame.

With the above-described mechanism, the load applying means 14 moves the drum D up and down.

The tire T which is to be measured is attached to the first movable member 4 having the tire support member TS at one end thereof and the other end disposed within the crank-shaped member 3. The tire T is free to rotate. In the vicinity of the tire support member TS is mounted a pulse generator which generates a reference position signal synchronized with the rotation of the tire T.

Thus, by manually raising or lowering the drum D through the handle HL, it is possible to impose on the tire T a load corresponding to an actual load that would be imposed thereon when a vehicle equipped with the tire T is running on a road, and by driving the drum D with the motor M, it is possible to detect only a lateral load acting on the rolling tire T by means of the first load cell LC1.

The display means 7 is, as shown in FIG. 1, disposed in an electric circuit container CS mounted on the upper side of a support post with sufficiently high rigidity which is provided on the machine base MB. On the front panel FP of the electric circuit container CS are disposed a recording unit RD, a meter MT, a switch SW and a level adjusting dial LA.

Figure 3:
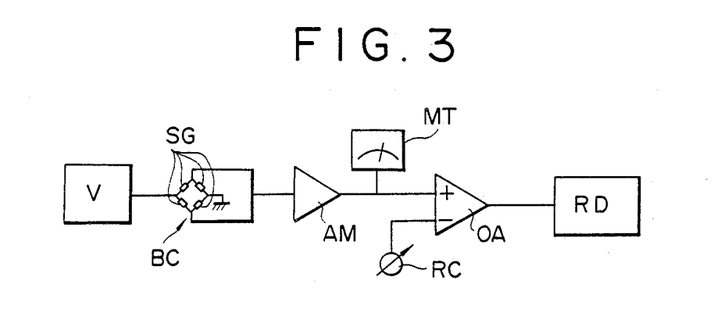

The display means 7 comprises an electric circuit shown in FIG. 3.

The load cell LC1 includes a bridge circuit BC in which strain gages SG are connected in full bridge form. The bridge circuit BC is energized by a voltage supplied from a power supply V, and an output signal from the bridge circuit BC is amplified in an amplifier circuit AM. The amplified signal is displayed on the load display meter MT. The display meter MT is graduated with markings indicative of kilograms, so that the operator can give a desired setting for the load to be applied to the tire T while observing an indication on the meter MT. The signal amplified in the amplifier circuit AM is then input to an operational circuit OA in which the signal is added to a given signal generated from a load setting circuit RC. More specifically, the operational circuit OA subtracts the signal representative of the load indicated by the load display meter MT from the signal generated from the load setting circuit RC in order to obtain only the signal representative of a load variation generated when the tire T is rotated. The signal resulting from the subtraction is led to the load variation display and recording unit RD in which the signal representative of a load variation is recorded on recording paper.

A position that has a failure in tire uniformity can be precisely determined by means of the pulse generator. More specifically, a first pulse signal which generates one pulse per revolution of the tire T and a second pulse signal which generates 500 pulses per revolution of the tire T are recorded on the recording paper. Since one revolution of the tire T corresponds to 360 degrees, a position which has a failure in uniformity can be readily located in terms of an angle corresponding to a tire reference position indicated by each pulse.

Thus, the tire uniformity measuring apparatus according to the first embodiment of the present invention clearly displays an L.F.V. waveform on the recording unit RD. According to this apparatus of the first embodiment, a force laterally acting on the tire T is electrically detected with high accuracy by means of the load cell in response to the movement of the cylindrical linear motion shaft 4a.

Since the apparatus of the first embodiment comprises the simple mechanism stated above, it is compact, less costly, easy to manufacture and highly practical.

Further, since the tire uniformity measuring apparatus of the first embodiment detects a force laterally acting on the ground surface of the tire T in the form of a load generated only in response to the movement of the linear motion shaft that constitutes the first movable member, it is possible to detect a force laterally acting on the tire T without being affected by forces acting in other directions. Moreover, it becomes unnecessary to execute an extra signal processing such as that in the conventional apparatus adapted to obtain a lateral force component by signal-processing the outputs from gages disposed in various directions.

The measuring apparatus of the first embodiment is further easy to handle and maintain, and since the drum D and the tire T are disposed vertically, the projected area occupied by the apparatus is relatively small and the apparatus is therefore compact, light in weight and inexpensive.

Since the measuring apparatus of the first embodiment employs a load cell as a displacement detecting means, it is possible to effect even more stable measurement in comparison with other strain gage type measuring devices.

In the apparatus of the first embodiment, the number of revolutions of the tire is 5 per minute, which is one order of magnitude smaller than in the case of the conventional apparatus, and it is therefore unnecessary to take particular measures to enhance the rigidity of the apparatus. In addition, the diameter of the drum D is 300 mm. Thus, the apparatus is reduced in size and weight.

A second embodiment of the present invention will next be explained with reference to FIG. 5.

The tire uniformity measuring apparatus of the second embodiment is arranged to be capable of detecting a variation in the load imposed radially of a tire being measured in addition to a variation in the lateral load. Since the load applying means and the display means have the same arrangements as those in the first embodiment, description thereof is omitted.

Figure 5:
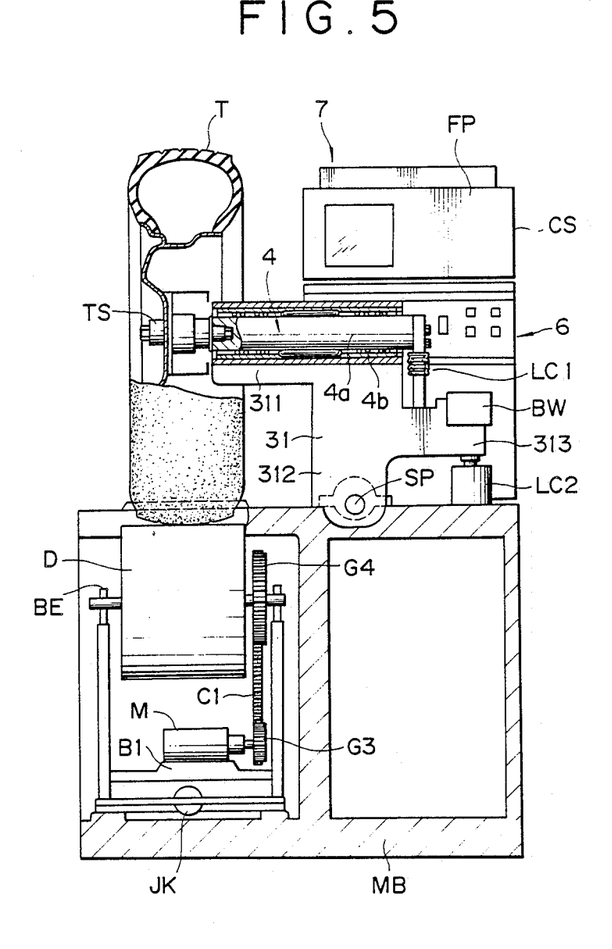
FIG. 5 is a front view of a second embodiment of the tire uniformity measuring apparatus according to the present invention.

Referring to FIG. 5, the measuring apparatus of this embodiment, which has an arrangement similar to that of the first embodiment, comprises a rotary drum D driven by an electric motor M, a tire support member TS rotatably supporting a tire T which is to be measured, a first movable member 4 supported on the tire rotating shaft of the tire support member TS in such a manner as to be slidable along the axis thereof, a second movable member 31 involving the first movable member 4 and constituting a box-like, crank-shaped oscillating arm having the center of its lower end pivotally supported on a machine base MB through a pivot shaft SP so as to be movable only within the plane including the axes of the tire rotating shaft and the drum rotating shaft, that is, movable in response to a variation in the radial force acting on the tire T, a second load cell LC2 for detecting a radial tire force installed between one end of the second movable member 31 and the machine base MB, a first load cell LC1 installed between the inner end of the first movable member 4 and the second movable member 31, a computing means 6 for measuring and computing a variation in the lateral force acting perpendicularly to the radial direction of the tire T that is outputted from the first load cell LC1 in response to a very small displacement of the first movable member 4 along the axis of the tire rotating shaft which possibly occurs as the tire T rolls as well as a variation in the radial tire force that is outputted from the second load cell LC2 in response to a very small displacement of the second movable member 31 about the pivot shaft SP which also possibly occurs as the tire T rolls, and a display means 7 for displaying the results of measurement and computation.

The second movable member 31 in the second embodiment, which constitute a box-like, crank-shaped oscillating arm, comprises a first portion 311, a second portion 312 and a third portion 313, as shown in FIG. 5. The first portion 311 accommodates the first movable member 4.

In the tire uniformity measuring apparatus according to the second embodiment, the first movable member 4 comprises a cylindrical linear motion shaft 4a which is disposed parallel to the axis of the shaft of the rotary drum D. The first movable member 4 is coaxially inserted into a cylindrical linear motion bearing 4b, specifically a stroke ball bearing, which is fitted in the first portion 311 of the oscillating arm 31 constituting the second movable member 31 which is pivotally supported at the central portion thereof on the machine base MB. The first movable member 4 rotatably supports the tire T at one end thereof through the tire support member TS and is supported on the tire rotating shaft of the tire support member TS in such a manner as to be slidable along the axis of the tire rotating shaft. To the end of the cylindrical linear motion shaft 4a which is remote from the tire T is integrally connected the first load cell LC1 secured to the third portion 313 of the oscillating arm 31 supporting the stroke ball bearing 4b to detect a lateral displacement of the tire rotating shaft which is dependent on variation in the lateral force acting on the tire T. Thus, a variation in the lateral load imposed on the tire T is detected on the basis of the detected lateral displacement of the tire rotating shaft. Since the function of the first movable member 4 and the lateral force component detecting mechanism of the first load cell LC1 are the same as in the case of the first embodiment, description thereof is omitted.

The second portion 312 is pivotally supported at the lower end portion in the approximate center of the second movable member 31 by means of the shaft SP that is rigidly secured at two ends thereof to the machine base MB in such a manner that the axis of the shaft SP lies in the horizontal plane including the surface of rolling contact between the drum D and the tire T. The first portion 311 extends horizontally at a position spaced apart from the pivot point of the second portion 312 by a distance equal to the average effective radius of the tire T. The first portion 311 has the tire support member TS disposed at one end thereof for rotatably supporting the tire T. The third portion 313 is present at the lower end of the side of the second movable member 31 which is remore from the tire support member TS. Between the third portion 313 and the machine base M is installed the second load cell LC2 for detecting a displacement of the second movable member 31 based on the load radially imposed on the tire T. The distance between the load cell LC2 and the supporting point SP of the second portion 312 is set so as to be equal to the distance between the supporting point SP and the center of the surface of rolling contact between the tire T and the drum D, thereby precisely measuring a variation in the load radially imposed on the tire T. As each of the first and second load cell LC1 and LC2, a cantilever type bending stress-sensitive load cell is usually employed; however, a tensile and compressive stress-sensitive load cell may also be used.

On the third portion 313 is disposed a balance weight BW which is as heavy as the tire T to counterbalance the tire T with respect to the supporting point SP of the second movable member 31, thereby increasing the degree of accuracy of measurement.

Thus, the tire uniformity measuring apparatus according to the second embodiment of the present invention is capable of clearly displaying an R.F.V. waveform on the recording unit RD, together with an L.F.V. waveform.

Since the tire uniformity measuring apparatus of the second embodiment detects a lateral force in the form of movement of the linear motion shaft independently of the radial force detecting mechanism, it is possible to detect a lateral force without being affected by the radial force and hence possible to comprehensively detect loads acting on the tire being measured. The apparatus of the second embodiment further has the same advantages as those described in the first embodiment.

A third embodiment of the present invention will next be explained with reference to FIGS. 6 and 7.

The tire uniformity measuring apparatus of this embodiment is arranged so as to be capable of simultaneously and independently measuring variations in the loads laterally, radially and tangentially imposed on the tire being measured. Although in the first embodiment the drum D and the tire T are disposed in vertically opposing relation to each other, in the apparatus of this embodiment they are disposed in horizontally opposing relation to each other, thereby reducing the overall height of the drum D and the tire T, and thus improving the operating efficiency.

Figure 6:
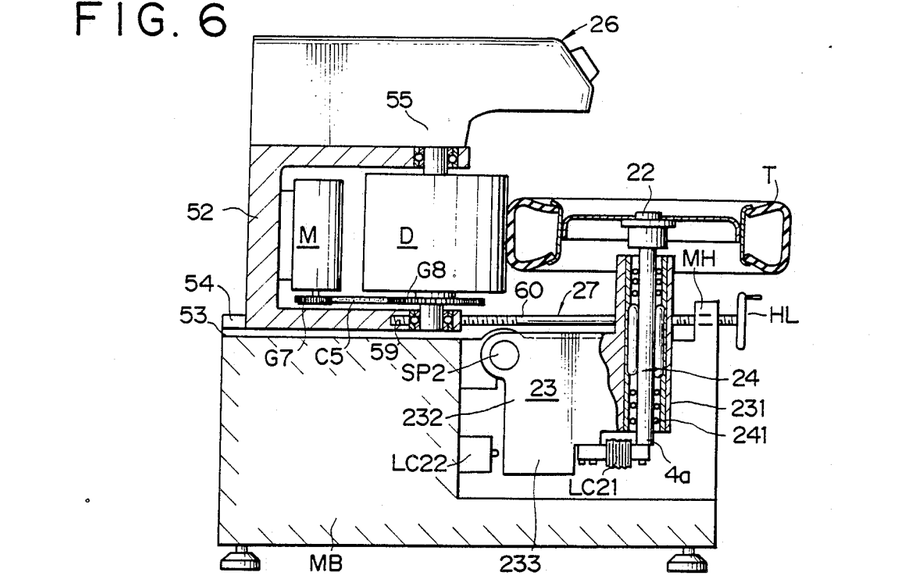
FIGS. 6 and 7 are side and front views, respectively, of a third embodiment of the tire uniformity measuring apparatus according to the present invention.
Figure 7:
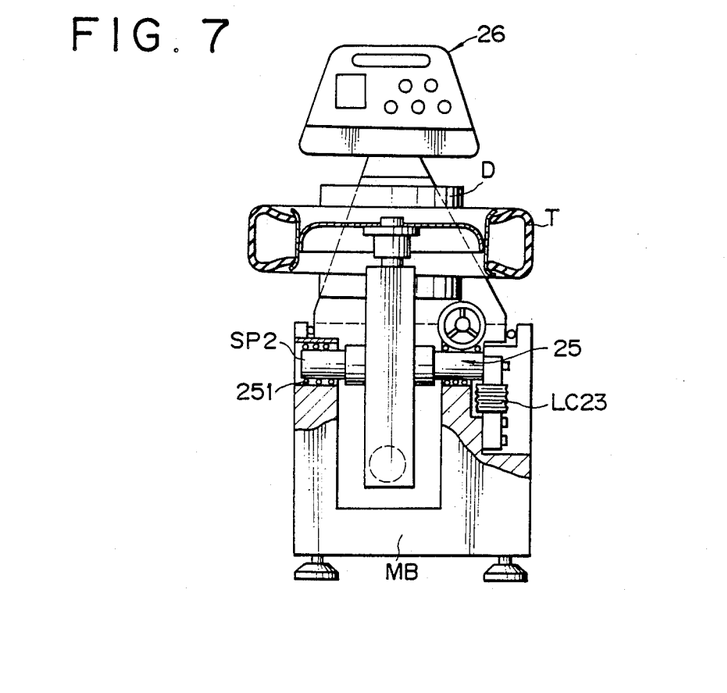

As shown in FIGS. 6 and 7, the measuring apparatus of this embodiment comprises a rotary drum D driven through a chain C5 connected to an electric motor M attached to a slide frame 52 mounted on a machine base MB, a tire support member 22 rotatably supporting a tire T which is to be measured, a first movable member 24 disposed on the tire rotating shaft of the tire support member 22 so as to be parallel to the drum rotating shaft of the drum D and slidable along the axis of the tire rotating shaft of the tire support member 22 in response to a variation in the load imposed laterally on the tire T, a second movable member 23 involving the first movable member 24 and constituting a box-shaped equilibrium arm having one end thereof pivotally supported on the machine base MB through a pivot shaft SP2, the second movable member 23 having the tire T rotatably supported at one end thereof, a second load cell LC22 for detecting a radial tire force which is provided at the end of the second movable member 23 which is remote from the tire T, a first load cell LC21 for detecting a lateral tire force which is provided between the inner end of the first movable member 24 and the second movable member 23, a third movable member 25 constituting the pivot shaft SP2 and slidable along the axis of the pivot shaft SP2 in response to a variation in the load tangentially imposed on the tire T, a third load cell LC23 for detecting a tangential tire load which is disposed between one end of the third movable member 25 and the machine base MB, a load applying means 27 for applying a predetermined load to the tire T by moving the slide frame 52 through a handle HL and a drive screw 60 to thereby move the drum D back and forth, a computing means 6 for measuring and computing variations in the lateral, radial and tangential forces acting on the tire T which are outputted from the first, second and third load cells LC21, LC22 and LC23, and a display means 26 for displaying the results of measurement and computation.

The second movable member 23 in the third embodiment, which constitute a box-like, crank-shaped oscillating arm, comprises a first portion 231, a second portion 232 and a third portion 233. The second portion 232 is pivotally supported at one end thereof by the pivot shaft SP2 which is rigidly secured at two ends thereof to the machine base MB in such a manner that the axis thereof lies within the plane including the surface of rolling contact between the drum D and the tire T, the second portion 232 being able to pivot only within the plane including the tire rotating shaft and the drum rotating shaft. The first movable member 24 comprises a cylindrical linear motion shaft 4a which is disposed parallel to the axis 55 of the rotary drum D. The first movable member 24 is coaxially inserted into a cylindrical linear motion bearing 241, specifically a stroke ball bearing, which is fitted in the first portion 231 of the second movable member 23 constituting the box-shaped equilibrium beam secured to the machine base MB. The first movable member 24 rotatably supports the tire T at one end thereof through the tire support member 22 and is supported on the tire rotating shaft of the tire support member 22 in such a manner as to be slidable along the axis of the tire rotating shaft. To the end of the cylindrical linear motion shaft 241 which is remote from the tire T is integrally connected the first load cell LC21 secured to the second movable member 23 supporting the stroke ball bearing 241 to detect a lateral displacement of the tire rotating shaft which is dependent on variation in the lateral force acting on the tire T. Thus, a variation in the lateral load imposed on the tire T is detected on the basis of the detected lateral displacement of the tire rotating shaft. The third movable member 25 comprises a cylindrical linear motion shaft that constitutes the pivot shaft SP2. Each end of the pivot shaft SP2 is coaxially supported in a cylindrical linear motion bearing 251, specifically a stroke ball bearing, fitted in the machine base MB so that the pivot shaft SP2 is slidable along the axis thereof in response to a variation in the force applied tangentially to the tire T.

In addition, the third load cell LC23 is secured between one end of the linear motion shaft and the machine base MB. The cylindrical linear motion shaft that constitutes the pivot shaft SP2 is internally in contact with the rolling contact surface of the stroke ball bearing 251 so as to be only linearly movable along the longitudinal axis, thereby making it possible to detect only a tangential force component acting on the surface of sliding contact between the tire T and the drum D in the form of a tangential force acting on the tire rotating shaft.

Between the third portion 233 of the second movable member 23 and the machine base MB is installed the second load cell LC22 for detecting a variation in the load radially imposed on the tire T. The distance between the load cell LC22 and the supporting point SP2 of the second portion 232 is set so as to be equal to the distance between the supporting point SP2 and the center of the surface of rolling contact between the tire T and the drum D, thereby precisely measuring a variation in the load radially imposed on the tire T independently of other force components. It should be noted that, since each of the first to third load cells converts a force applied thereto, the above-described displacements are so small that the rigidity of the apparatus will not be impaired. As each of the first to third load cells, either a bending stress-sensitive load cell or a tensile and compressive stress-sensitive load cell may be used.

As shown in FIG. 6, the load applying means 27 has a structure in which a slide surface 53 is provided on the machine base MB for smoothly sliding the slide frame 52 having a U-shaped cross-section and a guide member 54 is secured to the machine base MB for determining the direction of sliding of the slide frame 52. Thus, the drum D that is installed on the slide frame 52 is moved longitudinally and thereby pressed against the tire T.

As shown in FIG. 6, the slide frame 52, which is rigid, has at the forward end a drum shaft 55 supported through bearings and an electric motor M installed on the rear end portion. The drum D is driven by the motor M through a chain C5 which is engaged with a driving gear G7 and a driven gear G8. The slide frame 52 has on its side an internally helically threaded portion 59 through which extends a drive screw 60 supported by a support post MH secured to the machine base MB and having a handle HL. Thus, the slide frame 52 can be moved back and forth on the slide surface 53 and along the guide member 54 by rotating the handle HL.

With the above-described mechanism, the load applying means 27 moves the drum D back and forth.

Since the computing means 6 and the display means 26 have the same arrangements as those in the first embodiment, description thereof is omitted.

Thus, by manually moving the drum D back and forth through the handle HL, it is possible to impose on the tire T a load corresponding to an actual load that would be imposed thereon when a vehicle equipped with the tire T is running on a road, and by driving the drum D with the motor M, it is possible to detect a lateral load acting on the rolling tire T by means of the first load cell LC21, a reactive load acting on the tire shaft by the second load cell LC22 and a tangential load acting on the tire T by the third load cell LC23. On the basis of a signal detected by each load cell, the displaY means 26 records variations in the loads applied laterally, radially and tangentially of the tire T with a pen on chart paper in the recording unit RD.

The apparatus according to the third embodiment has the same advantages a those of the apparatus of the first embodiment and is further capable of independently and simultaneously detecting variations in the loads applied laterally, radially and tangentially of the tire T. In addition, since the drum D and the tire T are disposed in horizontally opposing relation to each other, the apparatus of this embodiment has higher operating efficiency than in the first embodiment.

Figure 8:
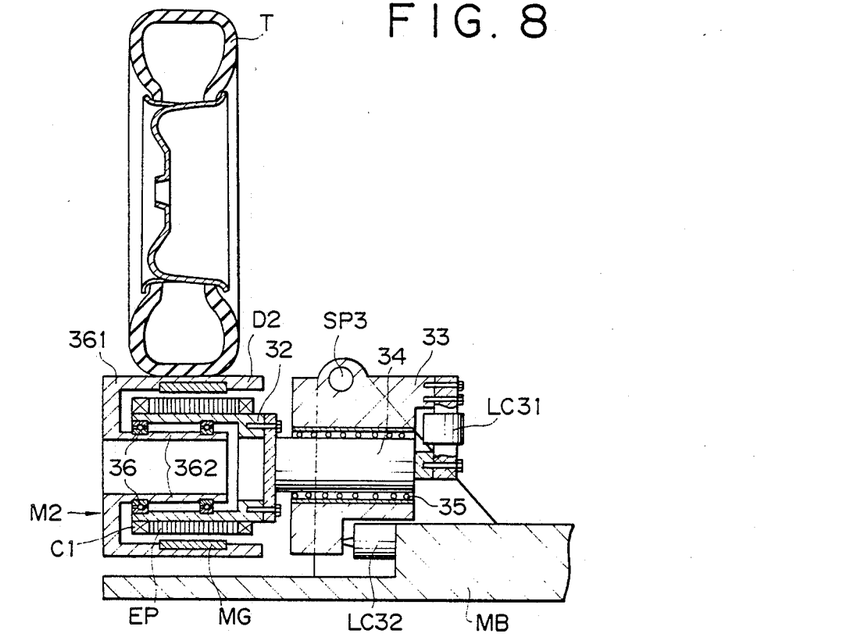
FIGS. 8 to 11 show in combination a fourth embodiment of the tire uniformity measuring apparatus according to the present invention, FIG. 8 being a front view of the apparatus, FIG. 9 a perspective view of the apparatus, FIG. 10 a general view of the apparatus, and FIG. 11 a side view of a vehicle mounted on the apparatus.
Figure 9:
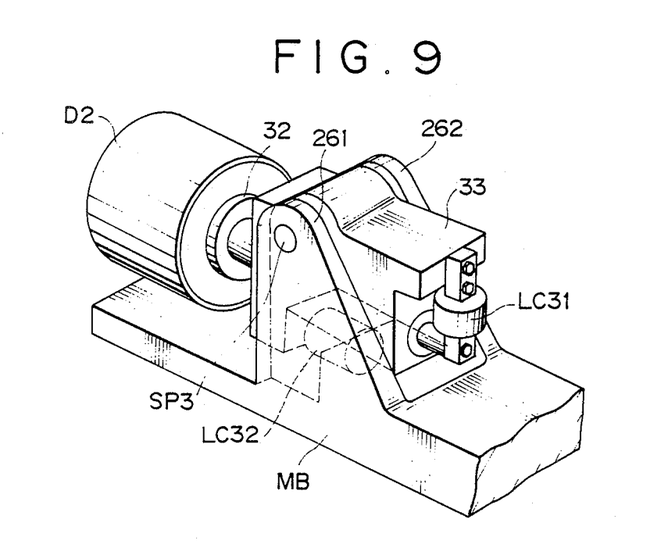

A fourth embodiment of the present invention will next be explained with reference to FIGS. 8 to 11. In the tire uniformity measuring apparatus of this embodiment, the tire T which is to be measured and the drum D are disposed in vertically opposing relation to each other in the same way as in the first embodiment. This embodiment is, however, different from the first embodiment in that the apparatus is of the so-called on-the-car type, that is, it is capable of measuring variations in the loads applied laterally and radially of the tire T actually mounted on a vehicle which is allowed to drive onto the tire uniformity measuring apparatus, thereby eliminating the need to detach and remount the tire T, and thus improving the operating efficiency. Although in the first embodiment the measuring devices are disposed on the tire (T) side, in this embodiment they are disposed on the drum (D) side in order to enable measurement in the on-the-car manner, which is one of the features of this embodiment. As shown in FIGS. 8 and 9, the apparatus of this embodiment comprises a rotary drum D2 driven by an outer rotor motor M, a drum support member 32 rotatably supporting at on end thereof the drum D2 in parallel to the axis of rotation of a tire T which is to be measured, a first movable member 34 slidable along the axis of rotation of the drum D2, a second movable member 33 involving the first movable member 34 and constituting a box-shaped oscillating arm having one end thereof pivotally supported on a machine base MB through a pivot shaft SP3 so as to be movable only within a plane parallel to the plane defined by the axes of rotation of the tire T and the drum D, a second load cell LC32 for detecting a variation in the load applied radially of the tire T, the load cell LC32 being installed between the lower end of the second movable member 33 and the machine base MB, a first load cell LC31 for detecting a variation in the load applied laterally of the tire T, the load cell LC31 being installed between one end of the first movable member 34 and the second movable member 33, a computing means for measuring and computing a variation in the lateral force acting perpendicularly to the radial direction of the tire T that is outputted from the first load cell LC31 in response to a very small displacement of the first movable member 34 along the axis of rotation of the tire T which possibly occurs as the tire T rolls as well as a variation in the radial tire force that is outputted from the second load cell LC32 in response to a very small displacement of the second movable member 33 about the supporting point SP3 which also possibly occurs as the tire T rolls, and a display means for displaying the results of measurement and computation.

The second movable member 33 in the apparatus of this embodiment comprises a box-shaped oscillating arm which is only movable within a plane parallel to the plane defined by the axes of rotation of the tire T and the drum D and is pivotally supported by the shaft SP3 which is in turn supported at both ends by support plates 261 and 262 projecting from two ends of the machine base MB in such a manner that the axis of the shaft SP3 is coincident with the plane including the upper end of the surface of rolling contact between the drum D2 and the tire T. The second movable member 33 accommodates the first movable member 34 extending on the axis of the drum rotating shaft of the drum support member 32.

The drum D2 comprises an outer cylinder 361 and an inner cylinder 362 which are connected together with a cover at the end of the drum D2 which is remote from the first movable member 34. The drum D2 is rotatably supported through a radial bearing 36 mounted between the outer peripheral surface of the inner cylinder 362 and the inner peripheral surface of the cylindrical drum support member 32 installed at one end of the first movable member 34. When axially moved, the drum D2 slides on the rolling contact surface of the stroke bearing 35 together with the drum support member 32 and the cylindrical linear motion shaft 34 having the drum support member 32 secured thereto. The outer rotor motor M2 is disposed between the cylindrical drum support member 32 and the outer cylinder 361 of the drum D2. The motor M2 comprises a permanent magnet MG provided on the inner peripheral surface of the outer cylinder 361 of the drum D2 and a combination of a coil C1 and an electromagnetic steel plate EP, which are attached to the outer peripheral surface of the drum support member 32, so that when a current flows through the coil C1, the drum D2 is rotated by means of electromagnetic force.

The first movable member 34 comprises a cylindrical linear motion shaft which is coaxially inserted into a cylindrical linear motion bearing 35, specifically a stroke ball bearing, which is disposed parallel to the axis of the tire T and fitted in the box-shaped equilibrium arm 33 secured to the machine base MB. The first movable member 34 is supported on the drum rotating shaft so as to be slidable along the axis of the drum rotating shaft together with the cylindrical drum support member 32 provided at one end thereof to rotatably support the tire T. To the end of the cylindrical linear motion shaft 34 which is remote from the drum D is integrally connected the first load cell LC31 secured to the box-shaped arm 33 supporting the stroke ball bearing 35 to detect a lateral displacement of the drum rotating shaft which is dependent on variation in the lateral force acting on the tire T. Thus, a variation in the load applied laterally of the tire T is detected on the basis of the detected lateral displacement of the tire rotating shaft. More specifically, the cylindrical linear motion shaft 34 is internally in contact with the rolling contact surface of the stroke ball bearing 35 so as to be only linearly movable along the longitudinal axis, thereby making it possible to detect only a lateral force component acting on the surface of sliding contact between the tire T and the drum D2 in the form of a longitudinal force acting on both the tire rotating shaft and the drum rotating shaft. In this embodiment, further, the cylindrical linear motion shaft 34 is disposed in the stroke ball bearing 35 which is within the plane including both the axes of rotation of the drum D2 and the tire T to detect a lateral tire force, together with a lateral force variation, acting between the tire T and the drum D2 in a direction perpendicular to the direction of rotation of the tire T in the form of the movement of the cylindrical linear motion shaft 34.

In this embodiment, when a vehicle having a tire T which is to be measured is set on the tire uniformity measuring apparatus, a predetermined load is applied to the drum D2 and, in this state, the drum D2 is driven to rotate by the outer rotor motor M2, thus causing the tire T to roll. As the tire T rolls in this way, the computing means 6 measures a variation in the lateral force acting perpendicularly to the radial direction of the drum D2 caused by a variation in the lateral load acting perpendicularly to the radial direction of the tire T, which is outputted from the first load cell LC31 in response to a very small displacement of the first movable member 34 along the axis of the drum rotating shaft, and a variation in the load applied radially of the drum D2 caused by a variation in the load applied radially of the tire T, which is outputted from the second load cell LC32 in response to a very small displacement of the second movable member 33 about the supporting point SP3. The measured values and the results of computation are displayed on a display means, for example, a CRT.

In this embodiment, the weight of each wheel of the vehicle being measured is employed as a load applied to the tire T being measured and the tire T is driven to rotate by the drum D2 under this loaded condition, thereby accurately and simultaneously measuring variations in the loads acting on the tire T radially and laterally, i.e., in a direction perpendicular to the radial direction of the tire T, at the surface of rolling contact between the tire T and the drum D2. The pivot shaft SP3 for the second movable member 33 in this embodiment is rotatably supported at both ends thereof on the machine base MB in such a manner that the axis of the pivot shaft SP3 lies within the horizontal plane including the surface of rolling contact between the drum D2 and the tire T, thereby eliminating the moment of the lateral force acting in a direction perpendicular to the direction of rotation of the tire T, and thus detecting only a variation in the radial tire force independently of the lateral tire force.

Figure 10:
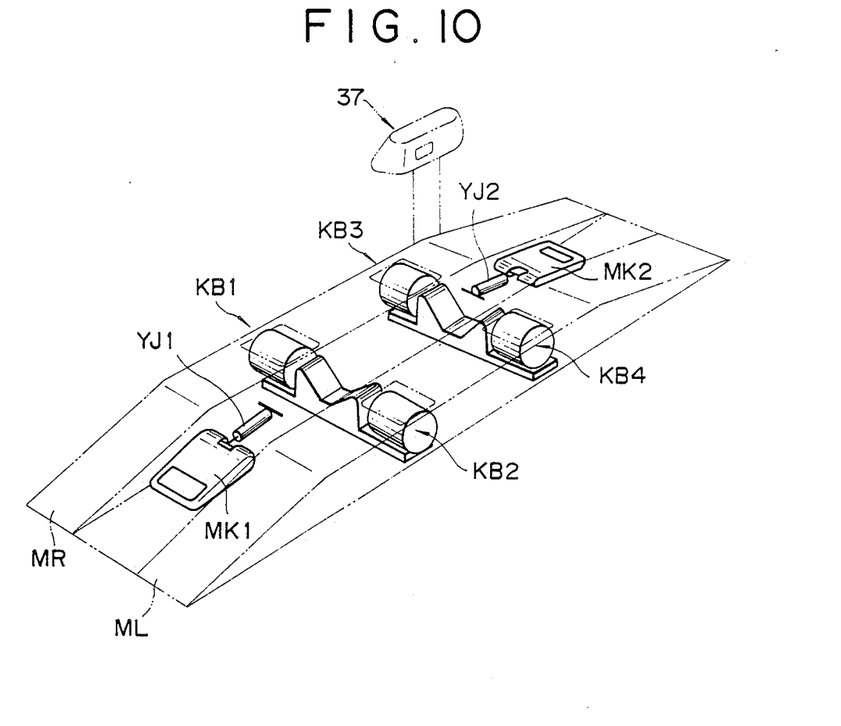
Figure 11:
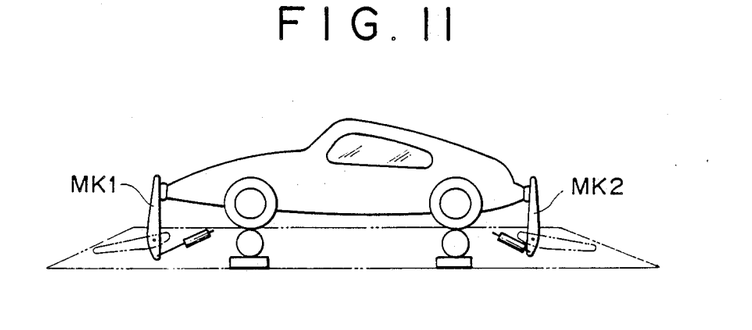

In this embodiment, load variation detecting units KB1, KB2, KB3 and KB4 each comprising a first movable member, a second movable member and load cells respectively provided in correspondence with these movable members are buried in the central portion of a vehicle mount comprising a pair of left and right mounts ML and MR, as shown in FIGS. 10 and 11. The mounts ML and MR have a trapezoidal cross-section with a view to facilitating movement of a vehicle which is to be measured thereon.

In addition, a moving mechanism is installed which is capable of setting the distance between the left and right movable members in accordance with the distance between the left and right tires of a vehicle which is to be measured.

Also installed is a moving mechanism which is capable of varying the distance between the movable members in accordance with the distance between the front and rear tires of a vehicle which is to be measured.

Further, vehicle securing units MK1 and MK2 are installed to clamp the front and rear bumpers of a vehicle to be measured from the front and rear sides in order to fix the vehicle during measurement. Hydraulic jacks YJ1 and YJ2 are associated with the respective vehicle securing units MK1 and MK2 to erect the latter from between the left and right mounts ML and MR so as to perform their functions only when the vehicle needs to be fixed. These jacks comprise electro-hydraulic jacks (not shown in FIG. 10).

Since the arrangement of the display means 37 is the same as in the first embodiment, description thereof is omitted.

In this embodiment, the load variation detecting units are disposed directly below four wheels, respectively, of the vehicle being measured to individually obtain an compute measured data. Accordingly, it is possible to simultaneouslY measure all the four tires of the vehicle for tire uniformity, and the operating efficiency therefore improves markedly.

As the vehicle is moved onto the drums, the tires which are to be measured are subjected to the same load as an actual load that would be imposed thereon when the vehicle is running on a road, and the drums are driven with the associated motors to rotate the tires, thereby detecting with the load cells variations in the loads acting on the tire shafts while the tires are rolling. The arrangement may be such that no motors are provided for the drums and the drums are rotated by rotating the tire driving shafts with the engine of the vehicle.

On the basis of the signals detected, the display means 37 displays variations in the loads on the CRT or records them on recording paper by means of the recording unit RD.

In the apparatus of this embodiment, the drums in the load variation detecting units disposed directly below four wheels of the vehicle may be driven by a single motor. In such a case, the structure of each detecting unit can be markedly simplified and the operation ca also be facilitated. The tire uniformity measuring apparatus of the fourth embodiment has the same advantages as those of the first embodiment and further enables measurement in an actual running condition with the tires being attached to the vehicle. Thus, it is possible to improve the operating efficiency and carry out even more precise measurement in comparison with the first embodiment.

It should be noted that, in the tire uniformity measuring apparatus of the second and fourth embodiments, the pivot shaft that pivotally supports the second movable member may be arranged to serve as a third movable member so that the cylindrical linear motion shaft constituting the pivot shaft is slidable along the axis of the pivot shaft in response to a variation in the force acting tangentially to the tire being measured, thereby making it possible to detect a variation in the load applied tangentially to the tire, in the same way as in the third embodiment. It is also possible to arrange the tire uniformity measuring apparatus such that it is only possible to detect a variation in either the tangential or lateral load.

Although the present invention has been described through specific terms, it should be noted here that the described embodiments ar not necessarily exclusive and that various changes and modifications may be imparted thereto without departing from the scope of the invention which is limited solely by the appended claims.

What is claimed is:

1. A tire uniformity measuring apparatus comprising:
a drum for rotating a tire which is to be measured;
a tire rotating shaft having a tire securing portion for securing said tire;
an oscillating member disposed parallel to the rotating shaft of said drum and pivotally supported at one end thereof on a machine base through a fulcrum;
a first movable member disposed within said oscillating member in parallel to said drum rotating shaft in the plane including said drum rotating shaft and said tire rotating shaft, said first movable member having at one end thereof a support portion rotatably supporting said tire rotating shaft, and said first movable member being laterally movable in response to a load acting on said tire rolling on said drum in lateral direction perpendicular to the radial direction of said tire;
load applying means for applying in advance a predetermined load to said tire by changing the interaxial distance between said drum rotating shaft and said tire rotating shaft by moving said drum;
first displacement detecting means interposed between said oscillating member and said first movable member for detecting as a displacement of said first movable member the displacement of said tire rotating shaft which is dependent on variation in the lateral load acting in a direction perpendicular to the line of action of the load applied radially of said tire when rotated by said drum; and
display means for displaying the variation in the lateral load acting in the direction perpendicular to the radial direction of said tire on the basis of the displacement of said first movable member;
whereby the variation in the lateral load acting on said tire is measured.

2. A tire uniformity measuring apparatus according to claim 1, wherein said first movable member comprises a cylindrical linear motion shaft which is coaxially supported within a cylindrical linear motion bearing disposed in a circular bore formed in the oscillating member disposed parallel to said tire rotating shaft and pivotally supported on said machine base, said linear motion shaft being supported on said tire rotating shaft so as to be slidable along the axis of said tire rotating shaft.

3. A tire uniformity measuring apparatus according to claim 1 or 2, wherein said oscillating member comprises a second movable member having said fulcrum which is disposed in or near the plane including the surface of rolling contact between said tire and said drum so that said second movable member pivots about said fulcrum in response to the radial tire load that acts between said drum and said tire said apparatus further comprising second displacement detecting means interposed between said machine base and said second movable member for detecting as a displacement of said second movable member the displacement of said tire rotating shaft which is only dependent on variation in the radial load acting on said tire when rotated by said drum, thereby measuring the variation in the radial load acting on said tire.

4. A tire uniformity measuring apparatus according to claim 1 or 2, further comprising a third movable member which is a shaft member constituting the fulcrum of said second movable member, said third movable member being disposed at right angles to said tire rotating shaft and supported in such a manner as to be slidable along its longitudinal axis so that said third movable member is movable along the longitudinal axis only in response to a variation in the tangential load acting on said tire when rotated by said drum, and third displacement detecting means interposed between said third movable member and said machine base for detecting a displacement of said third movable member, thereby detecting a variation in the tangential load acting on said tire.

5. A tire uniformity measuring apparatus according to claim 3, further comprising a third movable member which is a shaft member constituting the fulcrum of said second movable member, said third movable member being disposed at right angles to said tire rotating shaft and supported in such a manner as to be slidable along its longitudinal axis so that said third movable member is movable along the longitudinal axis only in response to a variation in the tangential load acting on said tire when rotated by said drum, and third displacement detecting means interposed between said third movable member and said machine base for detecting a displacement of said third movable member, thereby detecting a variation in the tangential load acting on said tire.

6. A tire uniformity measuring apparatus according to claim 5, wherein said third movable member comprises a cylindrical linear motion shaft which constitutes a pivot shaft for said second movable member, each end of said pivot shaft being coaxially supported within a cylindrical linear motion bearing disposed in a circular bore formed in said machine base in such a manner that said pivot shaft is slidable along the longitudinal axis thereof in response to a variation in the tangential force acting on said tire.

7. A tire uniformity measuring apparatus comprising:
a drum for rotating a tire which is to be measured;
a second oscillating member pivotally supported on a machine base through a fulcrum within the plane including the surface of rolling contact between said tire and said drum so that said second oscillating member pivots about said fulcrum in response to the radial tire load acting between said tire and said drum;
a drum rotating shaft for supporting said drum;
a fourth movable member having at one end thereof a support portion for rotatably supporting said drum rotating shaft, said fourth movable member being disposed within said second oscillating member in such a manner that its longitudinal axis is coaxial with said drum rotating shaft and parallel to the axis of rotation of said tire, thereby enabling said fourth movable member to move along the longitudinal axis in response to a lateral load acting on said tire in a direction perpendicular to the radial direction of said tire;
fourth displacement detecting means interposed between said fourth movable member and said second oscillating member for detecting as a displacement of said fourth movable member the displacement of said drum rotating shaft which is only dependent on the variation in the lateral tire load caused by a variation in the lateral load acting in a direction perpendicular to the radial direction of said tire when rotated by said drum; and
display means for displaying the variation in the lateral load acting in the direction perpendicular to the radial direction of said tire on the basis of the displacement of said fourth movable member;
whereby the variation in the lateral load acting on said tire is measured.

8. A tire uniformity measuring apparatus according to claim 7, wherein said fourth movable member comprises a cylindrical linear motion shaft which is coaxially supported within a cylindrical linear motion bearing disposed in a circular bore formed in the oscillating member disposed parallel to said tire rotating shaft and pivotally supported on said machine base, said drum being relatively rotatably supported on said linear motion shaft, so that said linear motion shaft is slidable along the axis of said drum rotating shaft in response to a displacement of said drum rotating shaft along its axis.

9. A tire uniformity measuring apparatus according to claim 7, wherein said fourth movable member comprises a cylindrical linear motion shaft which is coaxially supported within a cylindrical linear motion bearing disposed in a circular bore formed in the oscillating member disposed parallel to said tire rotating shaft and pivotally supported on said machine base, said drum being relatively rotatably supported on said linear motion shaft, said drum being driven by a motor, so that said linear motion shaft is slidable along the axis of said drum rotating shaft in response to a displacement of said drum rotating shaft along its axis.

10. A tire uniformity measuring apparatus according to claim 7 or 8, further comprising a fifth movable member constituted of the second oscillating member involving said fourth movable member and disposed within a plane including the axes of rotation of said tire and said drum, with the fulcrum which corresponds to the center of motion of said member with respect to said tire being disposed in or near the plane including the surface of rolling contact between said drum and said tire, so that said fifth movable member is movable about said fulcrum within said plane in response to a variation in the radial tire load acting between said drum and said tire, and fifth displacement detecting means interposed between said fifth movable member and said machine base for detecting as a displacement of said fifth movable member the displacement of said drum rotating shaft which is dependent only on variation in the radial load acting on said tire, thereby measuring a variation in the radial load acting on said tire in addition to a variation in the lateral load.

11. A tire uniformity measuring system comprising:
the tire uniformity measuring apparatus of claim 7 which is installed directly below the tire grounding surface at a position corresponding to each of the four tires of a vehicle to be measured;
moving means capable of varying the distance between said tire uniformity measuring apparatuses in accordance with the distance between the front and rear tires, which are to be measured, of the vehicle;
display means for displaying variations in the lateral and radial loads acting on said tires, said display means being disposed above the surface of rolling contact between said tires and the respective drums; and
securing means for securing said vehicle;
whereby variations in the lateral and radial loads acting on said tires are measured independently or in combination with said tires being attached to the vehicle.

* * * * *